(No Model.)
B. P. LUCE.
WICK RAISER.
No. 450,106. Patented Apr. 7, 1891.
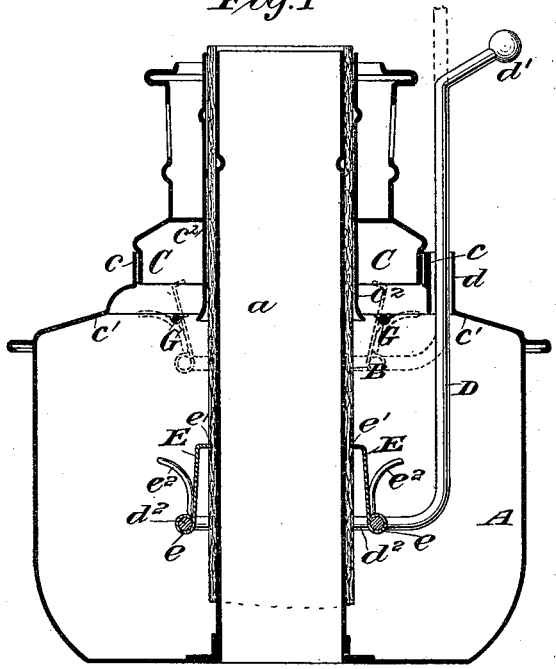
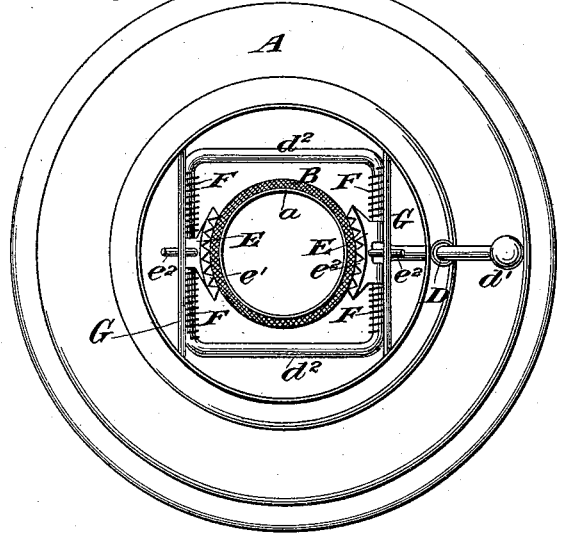
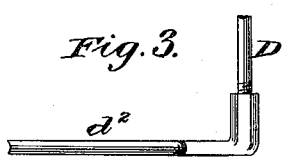
Witnesses:—
D. H. Hayward
C. Sundgren
Inventor:—
Bartlett P. Luce
by attorneys
Brown & Seward

UNITED STATES PATENT OFFICE.

BARTLETT P. LUCE, OF BOSTON, MASSACHUSETTS, ASSIGNOR TO THE BRISTOL BRASS AND CLOCK COMPANY, OF BRISTOL, CONNECTICUT.

WICK-RAISER.

SPECIFICATION forming part of Letters Patent No. 450,106, dated April 7, 1891.

Application filed November 22, 1890. Serial No. 372,305. (No model.)

*To all whom it may concern:*

Be it known that I, BARTLETT P. LUCE, of Boston, in the county of Suffolk and State of Massachusetts, have invented a new and useful Improvement in Wick-Raisers, of which the following is a specification.

My invention relates to an improvement in wick-raising mechanism for lamps in which a vertically-movable handle-bar extending from within the body of the lamp projects upwardly through the top of the lamp and carries upon its end within the lamp a pair of spring-actuated jaws for engaging the wick and moving it upwardly and downwardly upon a central wick-tube.

A practical embodiment of my invention is represented in the accompanying drawings, in which—

Figure 1 represents a vertical section through a lamp-bowl, showing in full lines the position of the wick-raising device in depressed adjustment engaged with the wick and in dotted lines the wick-raising device in elevated adjustment released from the wick. Fig. 2 is a top plan view, the central portion of the top of the lamp being removed; and Fig. 3 represents the loop portion of the wick-raiser removably secured to the operating-rod.

A represents the lamp-bowl, and $a$ the central tube about which the wick B is adjusted and upon which it is intended to slide up and down. The shape of wick-tube which I have selected for my present purpose is cylindrical; but it is evident that it might be oval or other well-known form in cross-section instead of cylindrical.

C represents the central portion of the lamp-top, which is intended to be removably secured to a collar $c$, projecting upwardly from the inner edge of the marginal portion $c'$ of the top.

A vertically-sliding operating-rod D extends with an easy sliding fit through a socket or guide $d$ in the lamp-top and is conveniently provided at its upper end with a handle $d'$ for operating it. At its lower end the rod D is bent substantially at right angles and extends laterally in loop form $d^2$ around the central tube $a$ and wick B and spaced from the wick. Upon the diametrically-opposite sides of the loop portion $d^2$, preferably upon the side on which the rod D is located and upon the opposite side therefrom, a pair of spring-actuated grasping-jaws E are mounted. The jaws E may be conveniently formed of thin pieces of metal, and from their lower ends $e$, where they loosely engage the opposite sides of the loop $d^2$, extend upwardly and inwardly, as shown in Fig. 1, and are provided at their upper ends with grasping-teeth $e'$, adapted to engage the opposite sides of the wick B. For the purpose of insuring a uniform movement of the wick throughout its circumference I find it desirable to spread the upper ends of the jaws E and curve their faces so that they will engage the opposite sides of the wick throughout a considerable portion of its circumference. The jaws E are held normally in engagement with the wick by the tension of springs F, here shown as coil-springs encircling the opposite sides of the loop portion $d^2$. The jaws E are swung outwardly against the tension of the springs F to release them from the wick.

The automatic release of the jaws from the wick is accomplished when the top C of the lamp is removed by means of a pair of slanting or curved arms $e^2$, secured at their lower ends to the backs of the jaws E and curving upwardly and outwardly in such position that their inner faces will engage with a pair of cross-rods G, as shown in dotted lines, Fig. 1. The cross-rods G are fixed upon opposite sides of the central tube $a$ to the marginal portion $c'$ at the top of the lamp.

When the parts are adjusted for use, the depending tube $c^2$, fixed to the top C, presents its lower end in such position that the upper ends of the jaws E will engage it before the arms $e^2$ engage the cross-rods G, and hence there will be no liability of the jaws becoming accidentally disengaged from the wick.

I have shown in Fig. 1 the loop portion $d^2$ as formed integral with the rod D, while in Fig. 3 I have shown the rod D removably engaged with the loop portion $d^2$, the latter construction admitting of the detachment of the operating-rod D from the loop portion and the consequent ready removal of the loop portion from the interior of the lamp for any purpose desired.

What I claim is—

1. A wick-raiser comprising an operating-rod, a loop extending laterally from the rod and adapted to surround the wick-tube and wick, a pair of spring-actuated wick-grasping jaws mounted upon opposite sides of the said loop, and means for swinging the jaws against the tension of the springs out of contact with the wick, substantially as set forth.

2. In combination, a lamp-bowl having a central wick-tube, a pair of rods fixed transversely across the upper portion of the bowl upon opposite sides of the wick-tube, a vertically-movable operating-rod extending from within the lamp-bowl through its top, a loop secured to the lower portion of the rod and adapted to surround the wick-tube and wick, a pair of spring-actuated wick-grasping jaws mounted upon opposite sides of the loop, and a pair of slanting arms secured at their lower ends to the backs of the jaws and extending upwardly and outwardly therefrom in position to engage the fixed rods at the top of the lamp and automatically release the jaws from the wick, substantially as set forth.

BARTLETT P. LUCE.

Witnesses:
DANIEL N. LATHROP,
CHAS. H. PIERCE.